United States Patent [19]
Porter et al.

[11] Patent Number: 4,923,729
[45] Date of Patent: May 8, 1990

[54] COATED FIRE BARRIERS FOR UPHOLSTERED FURNISHINGS

[75] Inventors: Rick A. Porter, North Augusta, S.C.; Hans R. Hoernle, Augusta, both of Ga.

[73] Assignee: Springs Industries, Inc., Fort Mill, S.C.

[21] Appl. No.: 270,828

[22] Filed: Nov. 14, 1988

Related U.S. Application Data

[62] Division of Ser. No. 74,074, Jul. 16, 1987, Pat. No. 4,806,185.

[51] Int. Cl.$^5$ .................. A47C 27/00; B32B 1/06; B32B 27/18; B32B 33/00
[52] U.S. Cl. .......................................... 428/71; 5/459; 297/DIG. 5; 428/34.7; 428/35.3; 428/35.9; 428/75; 428/76; 428/251; 428/252
[58] Field of Search .................... 5/459; 297/DIG. 5; 428/34.7, 35.3, 35.9, 71, 75, 76, 920, 921

[56] References Cited

U.S. PATENT DOCUMENTS 4,690,859  9/1987  Porter et al. .
4,806,185  2/1989  Porter et al. ........................ 428/920

Primary Examiner—James C. Cannon
Attorney, Agent, or Firm—Rodman & Rodman

[57] ABSTRACT

A method for increasing heat dissipation from the smolder or open flame site of an upholstered article by interposing a fire barrier material between the outer upholstery fabric and the filler or padding materials. The fire barrier material is formed by coating a fibrous substance, such as glass fibers, carbon fibers, and the like with a latex containing a finely divided heat conductive metal.

9 Claims, No Drawings

COATED FIRE BARRIERS FOR UPHOLSTERED FURNISHINGS

This is a division of application Ser. No. 074,074, filed July 16, 1987, and now U.S. Pat. No. 4,806,185.

BACKGROUND OF THE INVENTION

1. Field of the Invention

The present invention relates to improvements in the performance of coated fire barrier fabrics in contact with smoldering fires.

2. Description of the Prior Art

The term "upholster" means to fit out with covering material, padding, springs, etc., and is generally used in connection with furniture. The covering material, or face fabric, and fittings used to attach these materials to furniture, and the like, is commonly referred to as "upholstery".

Upholstery materials, primarily the covering material and padding have often been the site for propagation of fire from sources such as smoldering cigarettes and the like.

In order to contain and control smoldering fires in upholstered furnishings, specific configurations of flame resistant fabrics have been used as fire barriers interposed between the outer covering material and the filling materials. Such barriers envelop and contain the filling materials completely.

Copending U.S. patent application Ser. No. 721,307 filed Apr. 9, 1985, discloses the prevention of open flame combustion of upholstery filling material by controlling the porosity of the fabric to less than 200 cubic feet per minute of air per square foot, measured at room temperature at one-half inch of water pressure. It is believed that maintaining this parameter prevents sufficient oxygen flow to the filling or padding that is necessary to sustain combustion.

In general, upholstery materials exposed to high heat fail by two mechanisms. The first mechanism is where high external heat flux drives the pyrolysis of the filling material to combustion despite the containment provided by the barrier. A second failure mechanism occurs from the low oxygen demand of a smolder, that is, where burning and smoking occur without flame, and an object is consumed by slow combustion. It has been found that the low oxygen demand of a smolder can require an air supply as low as 0.1 cubic feet of air per minute.

A simple solution to the problem of controlling a smoldering fire in the outer upholstery fabric is to coat the fabric in a manner which renders it impermeable, thereby preventing the smolder site from reaching the padding or filling material. A drawback of this approach is that an enclosure such as a pillow or cushion covered with an impermeable fabric has an objectionable balloon-like feel unless some level of porosity is imparted to it.

Some approaches utilize ventilation ports as part of the construction of the pillow fabric, thereby allowing the use of non-porous materials such as vinyl chloride, which simulate leather.

The porosity of a porous fabric can be maintained to an extent by coating the fabric with a foamed latex base, or by using an unfoamed paste at limited add on, or by producing an impermeable coating followed by subsequent mechanical treatment, such as needling, to produce holes in the coating.

In general, the problem of extinguishing a smoldering fire is first addressed by draining the heat from the smolder area and/or by insulating the major fuel supply from the upholstered material, specifically the filling or padding, from the ignition source. A successful approach in extinguishing a smoldering fire can also provide improved performance in an open flame or high heat flux scenario.

SUMMARY OF THE INVENTION

The present invention relates to a method for increasing heat dissipation from the smolder or open flame site of an upholstered article by interposing a fire barrier material between the outer upholstery fabric and the filler or padding materials. The fire barrier material is formed by coating a fibrous substance, such as glass fibers, carbon fibers, and the like with a latex containing a finely divided heat conductive metal.

DESCRIPTION OF THE PREFERRED EMBODIMENTS

In accordance with the present invention, a method is provided for increasing heat dissipation from the smolder or open flame site of an upholstered article. The upholstered article comprises an outer fabric that houses and contains filler materials such as padding. The method involves interposing a fire barrier material between the decorative outer upholstery fabric and the filler materials. The barrier should completely envelop the filler material. The fire barrier fabric can be woven or nonwoven and is made of coated fibrous substances, such as glass fibers, carbon fibers, polyaramid, polybenzimidazole, polymeta-phenylene diamine isophthalate, and combinations thereof.

The coating consists of a latex of enhanced thermal conductivity containing a finely divided heat conductive metal such as aluminum, copper, nickel, and mixtures thereof, with the proviso that the outer upholstered fabric has a porosity rating of less than 10 cubic feet of air per minute per square foot, measured at a pressure of one-half inch of water. The amount of heat conductive metal can vary from about 4 to 20%, and preferably about 8 to 10% by weight of the coating composition.

Other additives such as aluminum trihydrate, chlorinated hydrocarbons and antimony oxide can also be included in the latex binder system to modify the flammability of the coating. The inclusion of the heat conductive metal powders or insulators in combination with flame resistant fibers serves to increase the heat dissipation from the smolder site of low heat flux fires. Such smoldering fires are typically self propagating at heat fluxes above 0.3 watts per square centimeter.

Although the fire barrier fabric has been described in the context of its use for upholstery where the barrier fabric is interposed between the outer face fabric and the filling materials, such as batting, cushioning and padding, it can also function as an effective fire barrier with for example, bedspreads, quilts or mattress ticking, and the like.

The outer face fabric and the fire barrier fabric can be attached sequentially to a cushion or furniture frame. Alternatively, a prelaminated fabric consisting of the face fabric can be adhesively laminated to the fire barrier fabric. The fire barrier fabric can also be sewn to an outer face fabric. The barrier fabric should be at least as large as the outer face or cover fabric, and the combined fabrics should completely envelop the filler material.

Underlying cushioning materials include polyester fiber fill, polyurethane foam, rubber, and cellulosic materials. These filling materials can also be modified with flame retardant chemicals to prevent smoldering, but such treatment usually increases the cost, can produce toxic combustion products, and still not be suitable for a high heat flux open flame combustion situation.

The thermal conductivity of the upholstery material can be reduced by employing various insulating materials which function essentially by retaining air into the structure. Such products can be flocked fibers, bulky nonwovens, tufted products, or expanded particles, all well known to those skilled in the art.

As has already been noted, the present invention addresses the prevention or reduction of fire danger in both smolder and open flame scenarios. Therefore, it is important that the insulating material or its combustion products which form the air retaining structure, have sufficient stiffness or structural stability at elevated temperature in order to retain the insulating void spaces in the structure. This requirement would eliminate thermoplastic and low ash weight polymer formulations. Examples of suitable insulating products are cellulosic materials, such as cotton, wood, paper, and the like treated with reagents such as borates and phosphates which modify their combustion characteristics to produce substantial amounts of char. Also included are precombusted materials such as carbon fibers, or fire resistant inorganic materials such as glass fibers or spheres, expanded materials such as vermiculite or organic foams which have been filled with up to 25% inorganic materials such as acrylic/clay or urethane/aluminum trihydrate, or fire retarded organic foams such as styrene/acrylonitrile containing urethane. The total amount of heat insulating materials or filler can vary from about 10 to 30% by weight.

Latex binders suitable for coating the fibrous materials include emulsion polymers such as vinyl chloride polymers, ethylene/vinyl chloride copolymers, vinylidine chloride/alkyl (meth)acrylate copolymers, vinyl chloride/vinyl acetate copolymers, neoprene polymers, vinyl acetate/alkyl acrylate copolymers, polyurethanes, styrene-butadiene and acrylonitrile-butadiene copolymers, and combinations thereof.

The examples which follow serve to illustrate the present invention. All parts and percentages are by weight, unless otherwise indicated. It is to be understood that the efficacy of the formulations in the examples will not be substantially changed by incorporating multiple applications or slightly modified formulations. Four basic coatings are described in the examples, along with an optional precoat to improve fabric handling and adhesion of the other coatings. The coatings include a white fire retarded coating to improve abrasion resistance, seam slippage, hand, and reduce porosity.

It is also understood that the coatings can be produced in any number of colors by including pigments. The inclusion of pigments can be used to embellish the appearance of the fire barrier. Two aluminum filled fire retarded coatings are also described, one for foam coating, and one for paste coating. The function is to increase heat dissipation across the face of the fabric and improve abrasion, seam slippage, hand, and reduce porosity. A vermiculite filled coating is also described which reduces heat transmission through the fabric and reduces porosity. It is evident that many combinations of these coatings are possible and that the examples focus upon selected practical combinations of primer coat, white coat, aluminum coat, and vermiculite coat.

EXAMPLE 1

A heat cleaned plain weave glass fabric having a count of 60 warp ends per inch and 58 filling ends per inch, made of D type filament at a weight of 3.16 ounce per square yard and an initial porosity of 80 cubic feet of room temperature air per minute per square foot of area at ½ inch of water pressure was given a primer coat by squeezing through pad rolls and drying to a dry add-on of about 1.25% based on the weight of the fabric.

| Prime Coat Formulation | |
|---|---|
| Component | Parts |
| gamma glycidoxypropyl trimethyl-silane | .3 |
| polyacrylic ester copolymer emulsion (50% solids) | 4.0 |
| polytetrafluoroethylene emulsion (25% solids) | 1.0 |
| antimigrant thickener gum | 2.0 |
| aqueous ammonia (26 Be) | .1 |
| water | 92.6 |

Over the optional prime coat a coating is applied to produce a white fabric with a porosity of 35 cubic feet per minute. Previous work has indicated that such coatings with porosities below 250 cubic feet will function adequately as a flame barrier for open flame ignition. The coating is made by horizontal padding or floating knife application or a combination of both. The dry add-on being 12% of the weight of the fabric.

| White Coating Formulation | |
|---|---|
| Component | Parts |
| water | 42.0 |
| antimony trioxide | 3.6 |
| chlorinated paraffin wax | 6.8 |
| ethyl acrylate/acrylonitrile copolymer latex (50% solids) | 26.0 |
| ethylene/vinyl chloride copolymer latex (50% solids) | 5.3 |
| triaryl phosphate plasticizer | 1.0 |
| ethyl acrylate/acrylic acid copolymer latex (35% solids) | 2.3 |
| ethoxylated octylphenol | 0.5 |
| aqueous ammonia (26 Be) | 0.5 |
| solution of ammonium stearate (33% solids) | 5.2 |

The coated fabric proved to have excellent abrasion resistance (60,000 cycles Wyzenbeck using cotton duck), good seam slippage and open flame fire performance.

Full scale construction of chairs and 9×9×2 inch small scale open flame tests with various decorative fabric covers and urethane foams as cushioning were conducted with and without the coated glass between the decorative fabric and urethane. Full scale testing used the Boston Bag ignition method in which a Kraft paper grocery sack containing ½ pound of newsprint is ignited in the seat of a chair located in an 11×14 foot room alone or with typical companion furnishings. In such full scale tests of chairs without barriers, flashover occurred in about 2.5 minutes with ceiling temperatures of 1370° F. With the white coated glass fabric of this example in place, flashover did not occur. Chairs with the glass barrier self-extinguished in about seven minutes with maximum ceiling temperatures of about 300° F.

In small scale tests the rate of weight loss at 50% combustion could be used as an indication of relative open-flame performance of the composite structure as shown below.

| Decorative Fabric | oz/sq. yd. |
|---|---|
| (1) Nylon flock on polyester/cotton | 8.7 |
| (2) Nylon backcoated | 7.7 |
| (3) Cotton (UFAC Velour Standard) | 14.5 |

UFAC is the Upholstered Furnishings Action Council which has established smolder test methods for the industry. In the test, a lit cigarette is placed in the seat of a mock small scale chair constructed with a standard velour decorative fabric over standard urethane foam.

| | Urethane Foam Type | Density (lb./cubic foot) |
|---|---|---|
| (A) | Combustion modified heat resistant urethane foam elastomer (Specifically Isothane CMHR - Reticel Corp.) | 2.8 |
| (B) | Fire retarded urethane foam elastomer (Specifically Reticel HR20 - Reticel Corp.) | 2.6 |
| (C) | Conventional (UFAC Standard) | 1.5 |

Averaged small scale open flame results as grams weight loss rate per minute (see table below) on the composite structure in a 9×9×2 inch backed 9×7×2 inch bottomed chair mockup using a pack of paper matches in the center of the mockup as an ignition source resulted in the following:

OPEN FLAME PERFORMANCE

| Test | Decorative | Urethane | Barrier Present | Instantaneous Weight Loss Rate Middle of Burn | Self-Exting. |
|---|---|---|---|---|---|
| 1 | None | C | No | 83 | No |
| 2 | 1 | C | No | 37 | No |
| 3 | 1 | C | Yes | 2 | Yes |
| 4 | None | B | No | 0 | Yes |
| 5 | 1 | B | No | 4 | Yes |
| 6 | None | A | No | 0 | Yes |
| 7 | 2 | A | No | 65 | No |
| 8 | 2 | A | Yes | 32 | Yes |
| 9 | None | C | No | 83 | No |
| 10 | 3 | C | No | 54 | No |
| 11 | 3 | C | Yes | 10 | Yes |

In every case, a reduction in the rate of combustion was obtained with the barrier in place. It is worth noting in trials 6, 7, and 8, that fire resistant urethane foam was greatly sensitized by the presence of the decorative fabric, yet the presence of the barrier still afforded protection.

Small scale vertical burn tests NFPA 701 and smolder tests on 2×8×8 inch backed 2×5×8 inch bottomed mockup using cigarette ignition by the UFAC method were performed; the results in grams lost per minute were as follows:

SMOLDER PERFORMANCE

| Test | Decorative | Urethane | Barrier Present | g/min Loss Rate 60 min | g/min Loss Rate 100 min | Self-Exting. | Inch. Char NFPA 701* |
|---|---|---|---|---|---|---|---|
| 13 | 3 | C | No | 7 | 35 | No | — |
| 14 | 3 | C | Yes | 5 | .4 | No | 1.3 |

*NFPA (National Fire Protection Association) 701 small scale is an open flame test on a 10 × 2 inch strip of fabric supported vertically.

Up to a point in time, the glass fabric has no substantial effect in a smoldering fire because so little oxygen is required to maintain the propagation of the smolder front. Eventually the fabric's porosity is reduced by combustion products and the smolder rate falls. This effect in these small scale tests occurs early because the surface areas are small. In larger specimens a substantial combustion can take place before the rate controlling step becomes diffusion of oxidant into the containment area filled with urethane foam.

More specifically, the extent of combustion of the urethane foam is relegated to the amount of oxygen that the fire can obtain. If a large pillow or cushion is burned there is initially more oxygen present in the large cushion than there would be in a small cushion. Further, because of the greater surface area of the large cushion, there is a greater area for oxygen to enter the cushion and more urethane will have to burn to plug the pores of the fabric and reduce its porosity.

At the onset of a smoldering fire, there is sufficient oxygen present and the rate of spread of the smolder front is controlled by the combustibility of the urethane. As the containment fabric plugs up, the smolder speed is at some point controlled not by the supply of and character of the urethane as a fuel, but by the limited supply of oxygen. Eventually the supply of oxygen is insufficient to allow the urethane to produce enough heat to make up for heat lost to the surroundings and the urethane temperature drops below the temperature needed to support combustion. At that time the fire goes out.

EXAMPLE 2

The same primer coated fabric from Example 1 was overcoated with a mechanically foamed aluminum containing formulation using a horizontal pad, the dry add-on being about 18% on the weight of the fabric giving 5.5% add-on of aluminum.

| Parts | Aluminum Containing Coating Formulation for Two-Sided Porous Application |
|---|---|
| 25 | ethyl acrylate/acrylonitrile copolymer latex (50% solids) |
| 20 | water |
| 3 | ethyl acrylate/acrylic acid copolymer (35% solids) |
| 6 | ammonium stearate (33% solids) |
| 1.5 | aqueous ammonia (26 Be) |
| 1 | adduct of stearic acid and diethanolamine |
| 10 | aluminum paste (73% solids) |

The coated fabric had excellent abrasion resistance, seam slippage and a porosity of 12 cubic feet per minute. It was tested by the small scale methods using decorative fabric 3 and urethane C, the UFAC standard materials as in Example 1 with the following results

| POROUS ALUMINUM COATING PERFORMANCE | | | | | | |
|---|---|---|---|---|---|---|
| Test Method | Barrier Present | Middle of Burn | g/min Loss Rate 60 min | g/min Loss Rate 100 min | Self-Exting. | Wt Loss at Self Exting. | Inch Char NFPA 701 |
| 15 - Open Flame | No | 54 | — | — | No | — | — |
| 16 - Open Flame | Yes | 11 | — | — | Yes | — | BEL* |
| 17 - Smolder | No | — | 7 | 35 | No | — | — |
| 18 - Smolder | Yes | — | 1.2 | 0 | Yes | 21 | BEL* |

*BEL = Burned Entire Length of 10 inches.

Although it may appear that the improvement in performance between test 14 and 18 is marginal, it is worth noting that the white coated product continued to burn whereas the aluminum coated product self-extinguished shortly after 100 minutes. It is theorized that this occurs because as the smolder front grows it reaches a size where the surface conduction drops the local temperature below that necessary to sustain the combustion.

The same prime coated fabric from Example 1 was overcoated with unfoamed aluminum containing formulations using a horizontal pad, the dry add-on of about 22% essentially evenly distributed throughout the fabric structure.

| Aluminum Containing Coating Formulations for Non-porous Application | | |
|---|---|---|
| Component | Parts Formula A | Parts Formula B |
| Ethyl acrylate/acrylonitrile copolymer latex (50% solids) | 55 | 65 |
| Water | 18 | 11 |
| Ethyl acrylate/acrylic acid copolymer (35% solids) | 4 | 5 |
| Aqueous ammonia (26 Be) | 1 | 1 |
| Decabromo biphenyl oxide | 3 | 3 |
| Antimony trioxide | 12 | 12 |
| Aluminum paste (73% solids) | 17 | 10 |

The coated fabric had excellent abrasion resistance, seam slippage and was non-porous. The add-on of aluminum varied from 6.3% for Formula A to 2.9% for Formula B. It was tested by the UFAC smolder method using decorative fabric 3, and urethane C. Results were as follows:

| NON-POROUS THROUGHOUT ALUMINUM COATING SMOLDER PERFORMANCE | | | | |
|---|---|---|---|---|
| Test | Barrier | Self-Exting. | Total Wt. Loss g | UFAC Class | Inches Char NFPA 701 |
| 17 | None | No | — | — | — |
| 18 | Porous | Yes | 21 | II*** | BEL* |
| 19 | Formula A | Yes | 1.5 | I** | 1.4 |
| 20 | Formula B | Yes | 1.6 | I | 1.3 |

*BEL = Burned the entire length of 10 inches.
**UFAC Class I = vertical char from cigarette is less than 2 inches.
***UFAC Class II = vertical char from cigarette is equal to or greater than 2 inches.

EXAMPLE 4

The same base fabric and coating compositions from Example 3 are knife coated on one side only to yield a 22% add-on. The coated fabric had excellent abrasion resistance on the coated side, excellent seam slippage and was non-porous. It was tested by the UFAC method with the aluminum side facing the decorative fabric 3 and the glass side facing the urethane C. Results were as follows:

| NON-POROUS ONE-SIDED ALUMINUM COATING SMOLDER PERFORMANCE | | | | |
|---|---|---|---|---|
| Test | Barrier | Self-Exting. | Total Wt. Loss g | UFAC Class | Inches Char NFPA 701 |
| 21 | Formula A | Yes | .5 | I | 1.4 |
| 22 | Formula B | Yes | 2.1 | I | 1.3 |

EXAMPLE 5

The fabric from Example 2 was coated on one side only with an unfoamed vermiculite formulation using a knife coater set at 0.07 inches. This resulted in a non-porous coating which was needle punched to give a porosity of ten cubic feet per minute.

| Vermiculite Containing Formulation | |
|---|---|
| Component | Parts |
| Water | 50 |
| Decabromo biphenyl oxide | 3 |
| Antimony trioxide | 12 |
| Vermiculite | 11 |
| Ethyl acrylate/acrylonitrile copolymer (50% solids) | 55 |
| Ethyl acrylate/acrylic acid copolymer (35% solids) | 8 |
| Aqueous ammonia (26 Be) | 3 |
| Defoamer | 1 |

The coated fabric was tested by UFAC Small Scale smolder methods with decorative fabric 3 and Urethane C.

| POROUS ALUMINUM/VERMICULITE COATING SMOLDER PERFORMANCE | | | |
|---|---|---|---|
| Test | Self-Extinguish | Total wt. loss g. | UFAC Class |
| 23 | Yes | 1.0 | I |

| SUMMARY | | | | | | |
|---|---|---|---|---|---|---|
| Flame Retardant Present | Metal Present | Insulation Present | Porous Fabric | UFAC Smolder Perform. | Open Flame Upholstry | NFPA701 Open Flame Hanging |
| Yes | No | No | Yes | Poor | Pass | Pass |
| No | Throughout | No | Yes | Poor | Pass | Fail |
| Yes | Throughout | No | No | Fair | Pass | Pass |
| Yes | One side | No | No | Excellent | Pass | Pass |
| Yes | One side | Other side | Yes | Excellent | Pass | Pass |

The results presented in the examples are summarized in the above table.

This table indicates that when using conventional decorative fabrics and upholstery filling materials, a product can be produced which can pass all tests commonly required of barrier materials such as the Boston Bag open flame ignition, NFPA 701 and UFAC tests when the decorative fabric is coated substantially on one side with compounds containing conductive metals and conventional flame retardants on a tightly woven glass fiber fabric of limited porosity.

Further, the insulation effect of the glass fiber material on the back of a one-sided aluminum coated fabric unexpectedly allows one to produce in an uncomplicated single pass, a coated product that addresses all the current performance criteria of a fire barrier fabric.

What is claimed is:

1. A fire resistant upholstered article comprising an outer upholstery fabric that houses and contains filler materials, and a fire barrier material interposed between the outer upholstery fabric and the filler materials, comprising a fibrous substance selected from the group consisting of glass, carbon, polyaramid, polybenzimidazole, polymeta-phenylene diamine isophthalate, and combinations thereof, coated with a latex of enhanced thermal conductivity containing a finely divided heat conductive metal selected from the group consisting of aluminum, copper, nickel, and mixtures thereof, and wherein said interposed fire barrier-upholstered fabric has a porosity rating of less than 10 cubic feet of air per minute per square foot measured at a pressure of $\frac{1}{2}$ inch of water.

2. The fire resistant upholstered article of claim 1, wherein the fibrous substance is glass.

3. The fire resistant upholstered article of claim 1, wherein the fibrous substance is carbon.

4. The fire resistant upholstered article of claim 1, wherein the fibrous substance is polyaramid.

5. The fire resistant upholstered article of claim 1, wherein the fibrous substance is polybenzimidazole.

6. The fire resistant upholstered article of claim 1, wherein the fibrous substance is polymetaphenylene diamine isophthalate.

7. The fire resistant upholstered article of claim 1, wherein the heat conductive metal is aluminum.

8. The fire resistant upholstered article of claim 1, wherein the heat conductive metal is copper.

9. The fire resistant upholstered article of claim 1, wherein the heat conductive metal is nickel.

* * * * *

UNITED STATES PATENT AND TRADEMARK OFFICE
CERTIFICATE OF CORRECTION

PATENT NO. : 4,923,729

DATED : May 8, 1990

INVENTOR(S) : Porter et al

It is certified that error appears in the above-identified patent and that said Letters Patent is hereby corrected as shown below:

At column 7, line 29, after line 29 insert
-- EXAMPLE 3 --.

Signed and Sealed this

Sixteenth Day of July, 1991

*Attest:*

HARRY F. MANBECK, JR.

*Attesting Officer*  *Commissioner of Patents and Trademarks*